(12) United States Patent
Wang et al.

(10) Patent No.: US 7,930,441 B2
(45) Date of Patent: Apr. 19, 2011

(54) USB DEVICE AND MODE DETECTING METHOD THEREOF

(75) Inventors: Hong-Si Wang, Taipei County (TW); Chuan-Hui Huang, Taipei County (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 283 days.

(21) Appl. No.: 11/924,926

(22) Filed: Oct. 26, 2007

(65) Prior Publication Data

US 2008/0195770 A1   Aug. 14, 2008

(30) Foreign Application Priority Data

Feb. 12, 2007 (TW) .................. 96105060 A

(51) Int. Cl.
*G06F 3/00* (2006.01)
(52) U.S. Cl. ................ 710/18; 710/8; 710/11; 710/14
(58) Field of Classification Search .............. 710/18
See application file for complete search history.

(56) References Cited

U.S. PATENT DOCUMENTS

| | | | |
|---|---|---|---|
| 6,415,342 B1* | 7/2002 | Wahl et al. ............... | 710/100 |
| 2005/0144345 A1* | 6/2005 | Nakano ................. | 710/100 |
| 2005/0188142 A1* | 8/2005 | Nakajima ............... | 710/303 |
| 2005/0228934 A1* | 10/2005 | Tsutsui ................. | 710/313 |
| 2006/0053244 A1 | 3/2006 | Fruhauf et al. | |
| 2006/0218330 A1 | 9/2006 | Tsunekawa | |

FOREIGN PATENT DOCUMENTS

JP   2003241870   8/2003

OTHER PUBLICATIONS

CN office action mailed Apr. 4, 2008.

* cited by examiner

*Primary Examiner* — Henry W Tsai
*Assistant Examiner* — Kris Rhu
(74) *Attorney, Agent, or Firm* — Thomas|Kayden

(57) ABSTRACT

A USB peripheral device and a method of determining USB speed mode. The method of determining USB speed mode for an USB peripheral device, wherein the USB peripheral device is coupled to an USB host through an USB transmission cable, and the USB transmission cable comprises power and ground lines for power supply, and first and second data signals for transmitting data, the method comprising the USB peripheral device pulling up voltage level of the first data signal with a first pull-up device, the USB peripheral device pulling up voltage level of the second data signal with a second pull-up device, and the USB host determining a high/full speed mode for the USB peripheral device, when detecting only one of the first and second data signals exceeding a threshold, and then detecting the other data signal exceeding the threshold in a predetermined period.

20 Claims, 5 Drawing Sheets

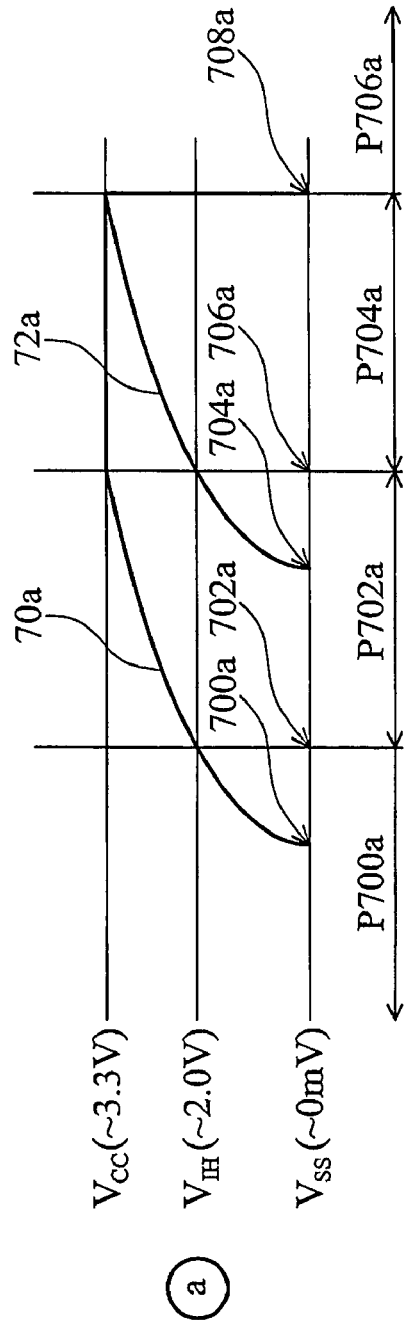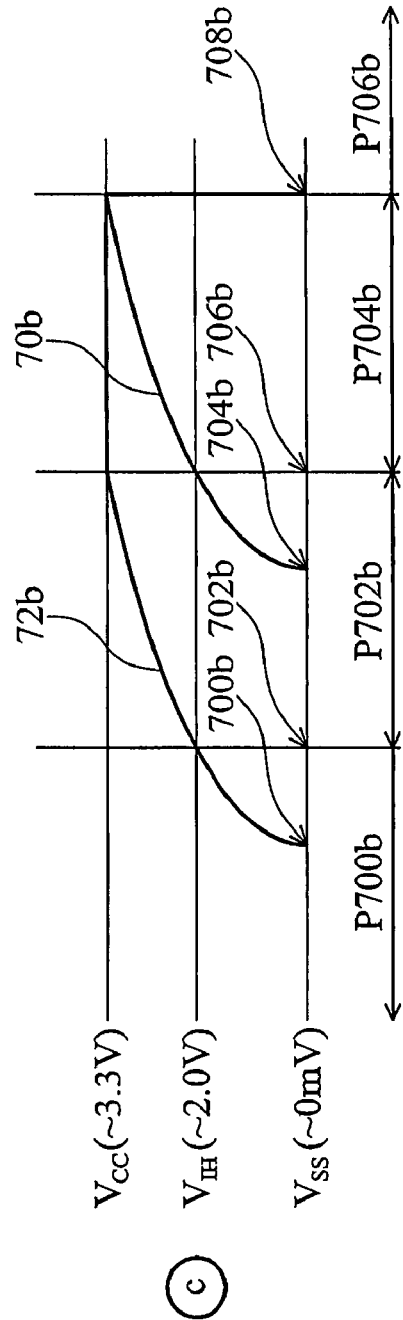
FIG. 5a
FIG. 5b

USB DEVICE AND MODE DETECTING METHOD THEREOF

BACKGROUND OF THE INVENTION

1. Field of the Invention

The invention relates to Universal Serial Bus (USB) systems, and in particular to a USB peripheral device and a method of determining a speed mode therein.

2. Description of the Related Art

USB (Universal Serial Bus) connectivity supports hardware peripherals, such as keyboard, mouse, scanner, printer . . . etc. USB 1.0, USB 1.1, and USB 2.0 standards specify three speed modes. USB 1.0 specifies a low speed mode, applicable to 1.5 Mbps data transmission, such as for keyboard and mouse. USB 1.1 defines full speed mode, capable of transmitting data up to 12 Mbps data rate. USB 2.0 specifies high speed mode, with data rate up to 480 Mbps. Each USB host is required to determine the correct speed mode thereof, such that data transmission can be carried out accordingly.

FIG. 1 is a block diagram of a USB system, comprising USB host 10, USB transmission bus 12, and USB peripheral device 14. USB host 10 is coupled to USB transmission bus 12, and then to USB peripheral device 14. USB host 10 comprises power supply 100 and host transceiver 102. USB transmission bus 12 comprises Vbus 120, Data+ line 122, Data− line 124, and GND 126. USB peripheral device 14 comprises power supply 140 and device transceiver 142.

Power supply 100 provides 5V power to host transceiver 102, implemented by hardware comprising a driver interface that receives instruction from a driver program and acts accordingly. Host transceiver 102 transmits signals compliant with USB standards to USB peripheral device 14. These signals generally are differential signal pair, transmitted through a twisted pair, i.e., Data+ line 122 and Data− line 124. Data+ and Data− signals on Data+ line 122 and Data− line 124 are half-duplex signals, i.e., the USB signal transmission is conducted by either USB host 10 or USB peripheral device 14 at one time, but not both simultaneously. Power supply 140 is a voltage regulator providing power for device transceiver 142, converting 5V from Vbus 120 to 3.3V. While FIG. 1 shows USB host 10 connected to a single USB peripheral device 14, multiple 14s may be connected to USB host 10 via branching structure.

FIGS. 2a and 2b show waveforms of Data+ and Data− signals compliant with USB standards for determining speed mode of a USB peripheral device, incorporating the USB system in FIG. 1, where the horizontal axis represents time, and the vertical axis represents detected voltages. Period $T_{connect}$ is connection time$_{DCNN}$ in USB standards.

FIG. 2a depicts a waveform diagram of signals on Data+ line 122 and Data− line 124 for high/full speed or full speed mode. Curve 20a is a voltage signal on Data+ line 122 and curve 22a a voltage signal on Data− line 124. Host transceiver 102 detects curve 20a increasing at time 200a, reaching $V_{IH}$ at time 202a, while curve 22a remains at voltage $V_{SS}$ throughout. Host transceiver 102 continues monitoring both signals after time 202a, and, if curve 20a stays above $V_{IH}$ and curve 22a remains at VSS in period $T_{connect}$, host transceiver 102 determines USB peripheral device 14 is either a high/full speed or a full speed USB peripheral device. Actual determination of whether its speed mode is high/full or full occurs only after USB peripheral device 14 receives a reset signal from host transceiver 102, based upon the following handshake between USB peripheral device 14 and host transceiver 102.

FIG. 2b depicts a waveform diagram of signals on Data+ line 122 and Data− line 124 for low speed mode. 20b is a voltage signal on Data+ line 122 and 22b a voltage signal on Data− line 124. Host transceiver 102 detects 22b increasing at time 200b, reaching $V_{IH}$ at time 202b, while 20b remains at voltage $V_{SS}$ throughout. Host transceiver 102 continues monitoring both signals after time 202a, if 22b stays above $V_{IH}$ and 20b remains at VSS in period $T_{connect}$, host transceiver 102 determines USB peripheral device 14 is a low speed USB peripheral device. Period $T_{connect}$ is connection time DCNN in USB standards.

It can be understood from the description above that the conventional method has no problem in recognizing a low speed USB peripheral device. However, the conventional method does have difficulty in distinguishing a high/full speed device from a full speed device, or vice versa, for these two speed devices cause completely the same voltage-to-time curve before the sending or receiving of a reset signal. Before the determination of whether a USB peripheral device is a high/full speed device or a full speed device, the USB peripheral device will first experience a full speed mode, and, after receiving a reset signal from a host transceiver, enter a high speed mode to cause the host transceiver entering the same high speed mode for data communication. Nevertheless, the sending and the receiving of the reset signal happen 100 ms after time 204a. Thus, the conventional method to identify a high/full device from a high device is too late and renders the delay of data communication. Also is it too complex for it requires the following Data+ and Data− handshake between USB peripheral device 14 and host transceiver 102 to make such identification.

Thus a need exists for a USB peripheral device and method to efficiently and quickly determine a speed mode thereof.

BRIEF SUMMARY OF THE INVENTION

A detailed description is given in the following embodiments with reference to the accompanying drawings.

A method of determining USB speed mode for an USB peripheral device, wherein the USB peripheral device is coupled to an USB host through an USB transmission cable, and the USB transmission cable comprises power and ground lines for power supply, and first and second data signals for transmitting data, the method comprising the USB peripheral device pulling up voltage level of the first data signal with a first pull-up device, the USB peripheral device pulling up voltage level of the second data signal with a second pull-up device, and the USB host determining a high/full speed mode for the USB peripheral device, when detecting only one of the first and second data signals exceeding a threshold, and then detecting the other data signal exceeding the threshold in a predetermined period.

Also provided is an USB peripheral device comprising a first pull-up device, a second pull-up device, and an USB device transceiver. The first pull-up device pulls up voltage level of a first signal. The second pull-up device pulls up voltage level of a second signal. The USB device transceiver, coupled to the first pull-up device and the second pull-up device, enables only one of the first and second pull-up devices such that the corresponding signal exceeds a threshold; and enables the other pull-up device such that the corresponding signal exceeds the threshold in a predetermined period, thereby indicating the USB peripheral device is a high/full speed device.

BRIEF DESCRIPTION OF THE DRAWINGS

The invention can be more fully understood by reading the subsequent detailed description and examples with references made to the accompanying drawings, wherein:

FIGS. 5a and 5b show waveforms of Data+ and Data− signals according to the invention.

DETAILED DESCRIPTION OF THE INVENTION

The following description is of the best-contemplated mode of carrying out the invention. This description is made for the purpose of illustrating the general principles of the invention and should not be taken in a limit sense. The scope of the invention is best determined by reference to the appended claims.

Figure 3:
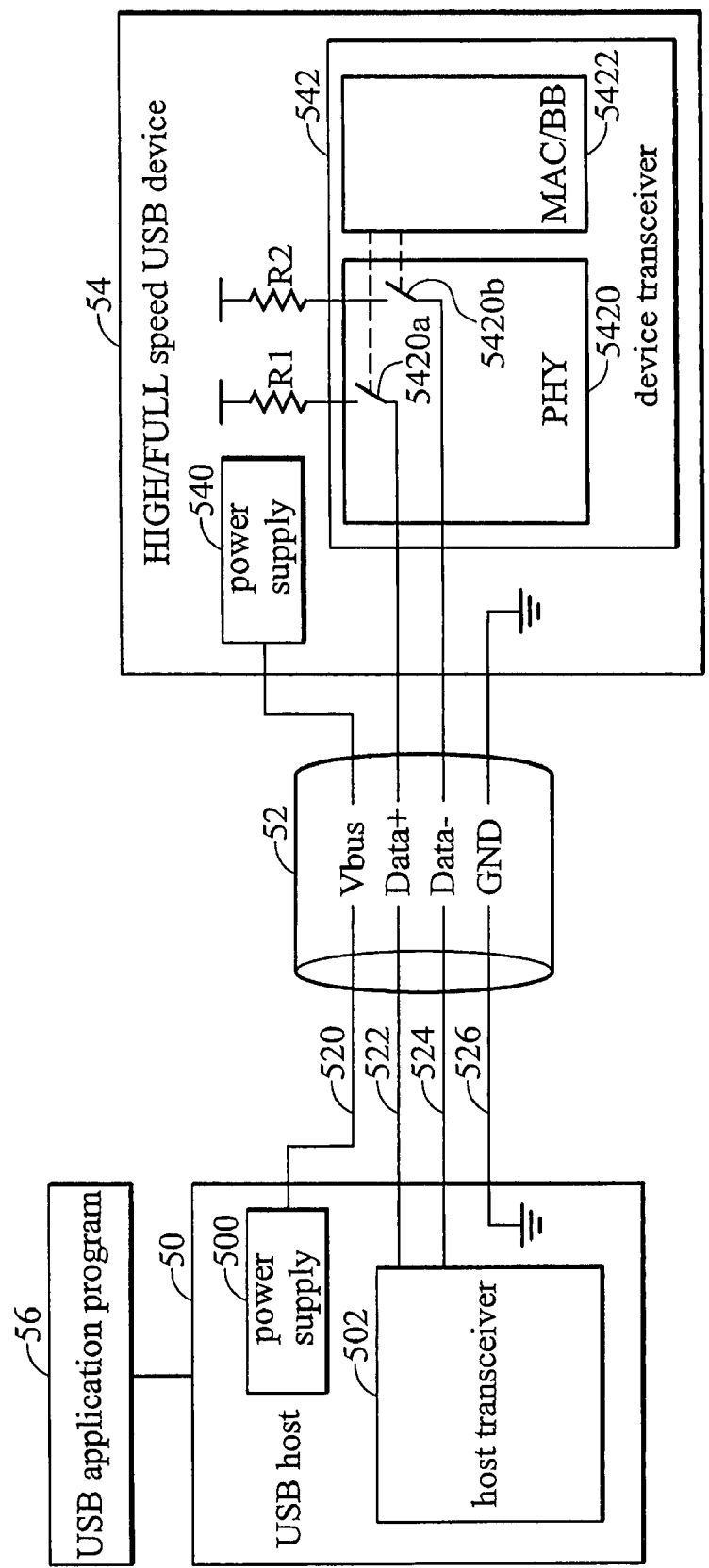
FIG. 3 is a block diagram of a USB system according to the invention.

FIG. 3 is a block diagram of a USB system according to the invention, comprising USB host 50, USB bus 52, USB peripheral device 54, and application program 56. USB host 50 comprises power supply 500 and host transceiver 502. USB peripheral device 54 comprises power adaptor 540, device transceiver 542, and pull-up resisters R1 and R2. USB bus 52 comprises Vbus 520 for providing power supply, Data+ line 522 and Data− line 524 for data transmission, and GND 526 for grounding. Data+ and Data− signals respectively transmitted on Data+ line 522 and Data− line 524 constitute a differential signal pair. Vbus 520 couples between power supply 500 and power adaptor 540 such that USB host 50 could power USB peripheral device 54. GND 526 couples the ground of USB host 50 to the ground of USB peripheral device 54.

Power adaptor 540 in USB peripheral device 54 converts voltage up or down to provide power supply Vcc for USB peripheral device 54, for example, converting 5V to 3.3V. Pull-up devices R1 and R2 may be 1.5 k ohm, each comprising one end connected to adapted power supply Vcc, and another end connected to first pull-up device 5420a or second pull-up device 5420b. By the control of device transceiver 542, pull-up resistors R1 and R2 may be coupled to Data+ 522 and Data− 544 respectively. Device transceiver 542 comprises a Physical layer (referred to as PHY hereinafter) device 5420 and Medium Access Control/Baseband (referred to as MAC/BB hereinafter) device 5422. PHY device 5420 comprises first pull-up device 5420a coupled to resistor R1 and data+ 522, and second pull-up device 5420b coupled to resistor R2 and data− 524, for disconnecting or connecting pull-up resistors R1 and R2 to Data+ 522 and Data− 524. First pull-up device 5420a and second pull-up device 5420b may be switches implemented by MOS transistors.

Host transceiver 502 may comprise a timer (not shown) calculating the connection duration on Data+ line 522 and Data− line 524 between USB host 50 and USB peripheral device 54. The timer may count connection duration $T_{connect}$ compliant with the requirement in USB standard, approximately 2.5 ms.

Table 1 shows a comparison between signal pin settings for the determination of USB peripheral device speed according to the USB standard and the exemplary disclosure of the invention. The signal pin setting determines speed mode of a USB peripheral device. In a conventional method, a common signal pin setting (Data+=1, Data−=0) is utilized for both high/full and full speeds, and causes the delay of distinguishing between high/full and full speeds. The disclosure utilizes separate pin settings, (Data+=1, Data−=1) and (Data+=1, Data−=0), for high/full and full speeds, respectively. Upon power adaptor 540 in USB peripheral device 54 receives the power supply from USB host 50 through Vbus 520 for power adaptation and electronic components in USB peripheral device 54 are properly powered, MAC/BB device 5422 in device transceiver 542 enables first pull-up device 5420a and second pull-up device 5420b to pull up the voltage potential in Data+ 522 and Data− 524 to high voltage potential Vcc, so that host transceiver 502 in USB host 50 can detect "1 1" from Data+ and Data− pins, indicating USB peripheral device 54 being a high/full speed USB device. These processes are to be complete prior to the occurrence of a reset signal issued by USB host 50, and, possibly, prior to the end of the duration $T_{connect}$ when both voltage potentials at Data+ 522 and Data− 524 are pulled up to more than threshold $V_{IH}$. Accordingly, the speed mode of an USB peripheral device is quickly and correctly identified.

TABLE 1

| The disclosure USB peripheral device speed mode | Pin name | | USB 2.0 standard USB peripheral device speed mode |
|---|---|---|---|
| | Data+ | Data− | |
| Disconnected | 0 | 0 | Disconnected |
| Low speed | 0 | 1 | Low speed |
| Full speed | 1 | 0 | high/full or full speed |
| high/full speed | 1 | 1 | Not applicable |

Figure 4:
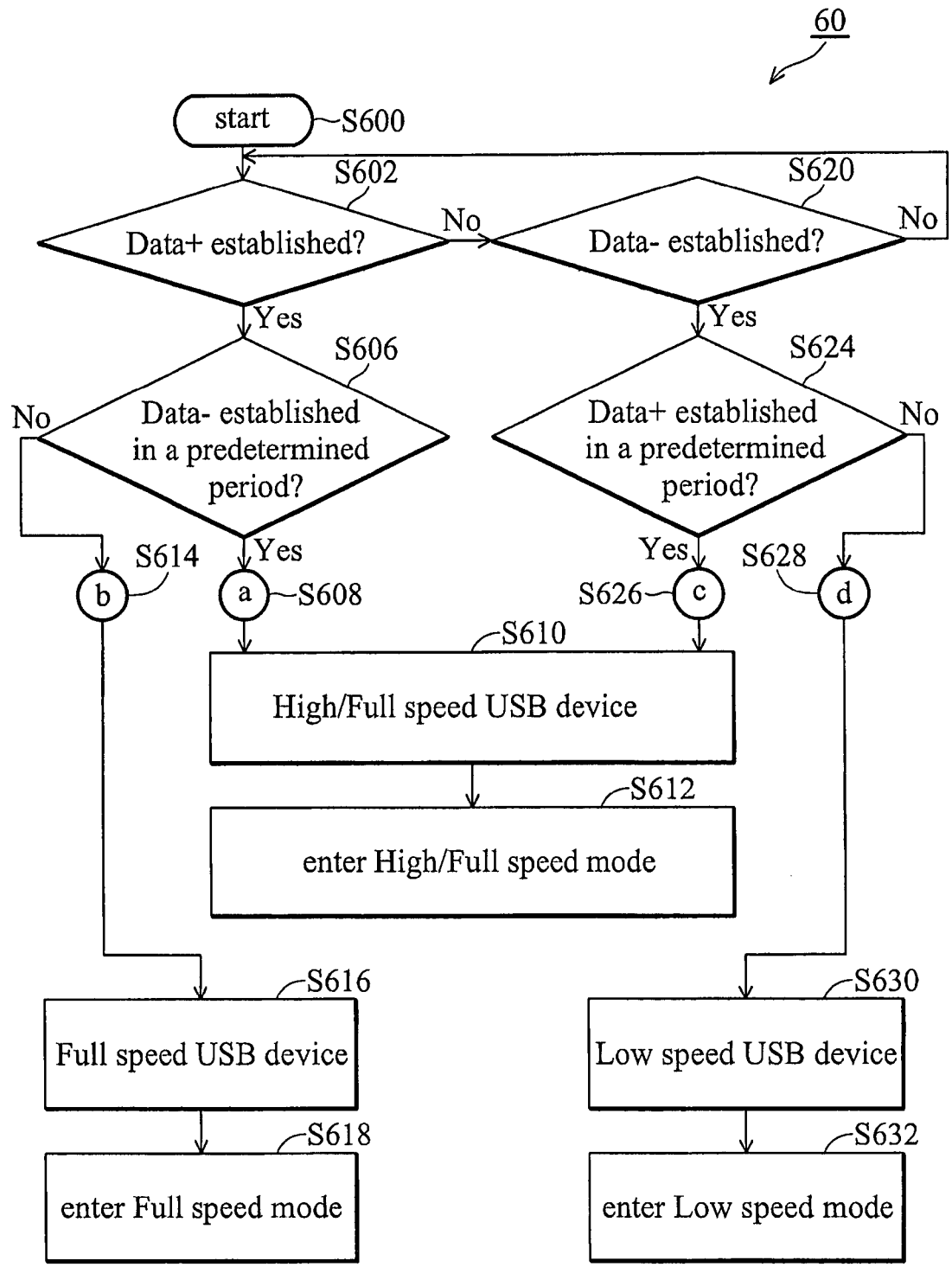
FIG. 4 is a flowchart of an exemplary method for determining USB speed mode according to the invention.

FIG. 4 is a flowchart of an exemplary method for determining USB speed mode according to the invention, incorporating the USB system in FIG. 3.

Upon connecting USB peripheral device 54 to USB host 50, application program 56 directs host transceiver 502 to detect Data+ and Data− signals on Data+ line 522 and Data− line 524 (Step S600). In Step S602, host transceiver 502 monitors voltage potential of Data+ signal on Data+ line 522 to determine connection. If host receiver 502 detects the voltage potential at Data+ line 522 exceeding a predetermined threshold, for example, 2.0V, Step S606 is carried out. If not, Step S620 proceeds. By doing this way, if the voltage potential of Data+ signal on Data+ line 522 exceeds the predetermined threshold, host transceiver 502 determines a connection is established for Data+ signal, otherwise Data+ signal is disconnected.

Next in Step S606, host transceiver 502 determines whether a connection is established on Data− line 524 in a period $T_{connect}$ timed by a timer, or prior to the reset signal issued by USB host 50. If the voltage potential at Data− 524 is also pulled up and exceeds the predetermined threshold in the period $T_{connect}$, application program 56 directs to a condition depicted in Step S608, indicating USB peripheral device 54 is a high/full speed USB device, and proceeding Step S610. If not, application program 56 directs to a condition depicted in Step S614, indicating a full speed USB device, and Step S616 is carried out.

In Step S610, since in the period $T_{connect}$ Data+ and Data− signals both exceed the predetermined threshold, application program 56 determines the speed mode of USB peripheral device 54 is high/full speed, and sends a reset signal to USB peripheral device 54. Upon the receiving of the reset signal, device transceiver 542 resets Data+ and Data− signals to "LOW" by disabling pull-up devices 5420a and 5420b. MAC/BB module 5422 opens pull-up devices 5420a and 5420b to disconnect pull-up resistors R1 and R2 from Data+ line 522 and Data− line 524. In Step S612, data transmission is performed at high/full speed.

In Step S616, since Data+ signal exceeds the predetermined threshold and Data− signal stays approximately at "LOW", application program 56 determines the speed mode of USB peripheral device 54 is full speed, and USB host 50 and USB peripheral device 54 start to perform data transmission at full speed after USB host 50 issues a reset signal (Step S618).

In Step S620, since Data+ signal has been recognized as "LOW", host transceiver 502 monitors whether the voltage potential of Data− signal exceeds the predetermined threshold. If so, Step 624 is carried out, and, if not, indicating USB peripheral device 54 is not properly connected, Steps S602 is periodically repeated to check whether there is a proper connection established between USB peripheral device 54 and USB host 50.

In Step S624, host transceiver 502 determines whether a connection is established on Data+ line in a period $T_{connect}$ timed by the timer, or prior to the reset signal issued by USB host 50. If the voltage potential at Data− 524 is also pulled up and exceeds the predetermined threshold in the period $T_{connect}$, application program 56 determines Data+ and Data− signals both exceed the predetermined threshold, and directs to a condition depicted in Step S626 followed by Step S610. In Step S626, USB peripheral device 54 is indicated as a high/full speed USB device. As discussed before for step S610, USB host 50 then issues a reset signal to reset the voltage potentials at Data+ and Data− lines 522, 524 to prevent disturbance to the following high/full speed data transmission. If in step S624 it is determined that the voltage potential at Data− 524 does not exceed the predetermined threshold in the period $T_{connect}$, application program 56 determines that Data− signal becomes "HIGH" while Data+ signal remains "LOW", as depicted in Step S628, and Step S630 follows. In Step S630, application program 56 determines the speed mode of USB peripheral device 54 is low speed, such that USB host 50 and USB peripheral device 54 perform data transmission therebetween at low speed after USB host 50 issues a reset signal.

FIGS. 5a and 5b show voltage-time waveforms of Data+ and Data− signals according to the invention, incorporating the USB system in FIG. 3 and the speed determination method in FIG. 4.

FIG. 5a shows a waveform detected by host transceiver 502 at Step S608, where curve 70a is the voltage potential of Data+ signal on Data+ line 522, curve 72a is the voltage potential of Data− signal on Data− line 524. Host transceiver 502 detects that curve 70a starts to rise at time 700a, reaches predetermined threshold $V_{IH}$ at time 702a, and continues rising, Curve 72a starts increasing at time 704a, reaches predetermined threshold $V_{IH}$ at time 706a, and continues rising. In case that period P702a, the time period from time 702a to time 706a, is shorter than the period $T_{connect}$ defined in USB standard, then USB peripheral device 54 is determined to be a high/full speed USB device. At time 708a, host transceiver 502 issues the reset signal to reset 70a and 72a. Host transceiver 502 and device transceiver 542 can then perform data transmission at high/full speed upon completion of the reset.

FIG. 5b shows a waveform detected at Step S626, where curve 70b is the voltage potential of Data+ signal on Data+ line 522, curve 72b is the voltage potential of Data− signal on Data− line 524. Host transceiver 502 detects that curve 72b starts to rise at time 700b, reaches predetermined threshold $V_{IH}$ at time 702b, and continues rising. Curve 70b starts increasing at time 704b, reaches predetermined threshold $V_{IH}$ at time 706b, and continues rising. In case that period P702b, the time period from time 702b to time 706b, is shorter than the period $T_{connect}$ defined in USB standard, then host transceiver 502 determines that USB peripheral device 54 is also a high/full speed USB peripheral device. At time 708a, host transceiver 502 issues the reset signal to reset 70a and 72a, and then host transceiver 502 and device transceiver 542 perform data transmission at high/full speed upon completion of the reset.

Figure 1:
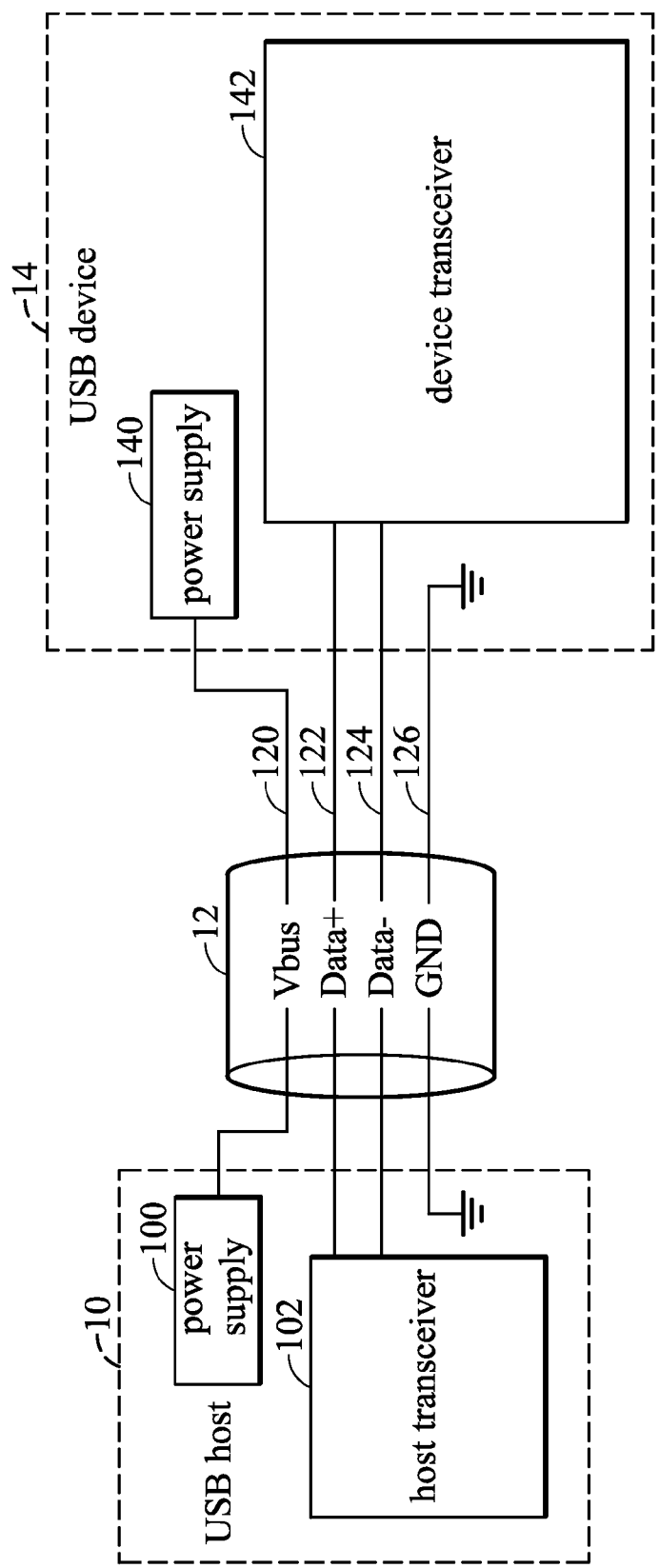
FIG. 1 is a block diagram of a USB system.
Figure 2A:
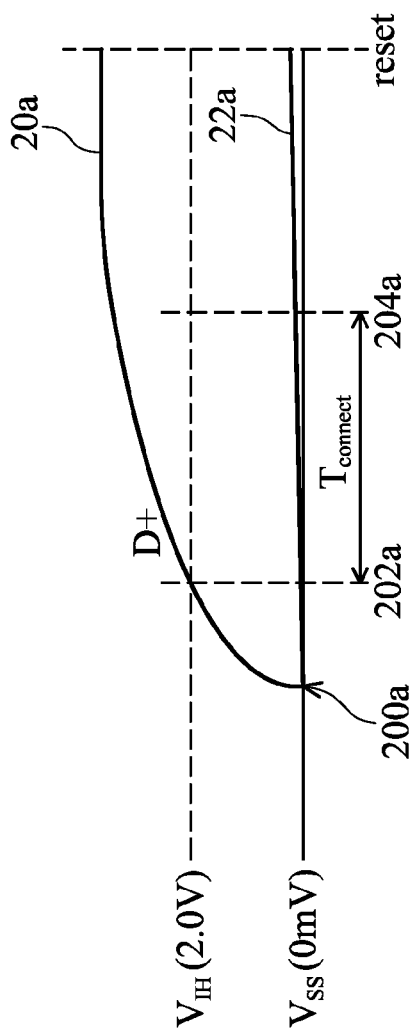
FIGS. 2a and 2b show waveforms of Data+ and Data− signals compliant with USB standards for determining speed mode of a USB peripheral device.
Figure 2B:
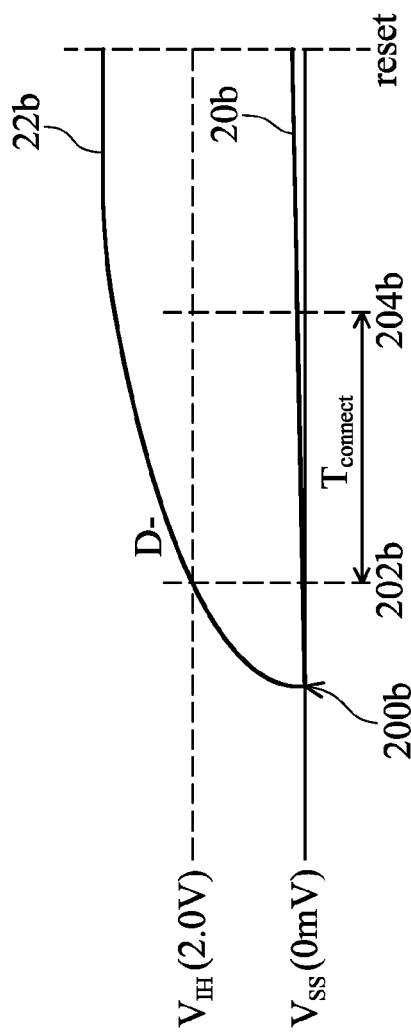

Apart from the two conditions in FIGS. 5a and 5b, when the detected voltage potential on the Data+ line exceeds predetermined threshold VIH, but the voltage potential on Data− line remains at approximately Vss, as depicted in FIG. 2a, USB peripheral device 54 will be determined as a full speed USB device, thus further determination for a high/full speed USB device is not required. When the detected voltage potential on the Data− line exceeds predetermined threshold VIH, but the voltage potential on Data+ line remains at approximately Vss, as depicted in FIG. 2b, USB peripheral device 54 will be determined as a low speed USB device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting USB speed mode for a USB peripheral device, wherein the USB peripheral device is coupled to a USB host through a USB transmission cable, and the USB transmission cable comprises power and ground lines for power supply, and first and second data signals for transmitting data, the method comprising:
   the USB peripheral device pulling up a voltage level of the first data signal with a first pull-up device;
   the USB peripheral device pulling up a voltage level of the second data signal with a second pull-up device; and
   the USB host determining a high/full speed mode for the USB peripheral device, when detecting only one of the first and second data signals exceeding a threshold, and then detecting the other data signal exceeding the threshold in a predetermined period, wherein no reset signal is generated before said pulling up of the first and second data signals and said determining of the high/full speed mode.

2. The method of claim 1, wherein the predetermined period is a time interval awaiting for the first and second data signals pulled up to the threshold, or a duration for the USB host to generate a reset signal compliant with the USB standard, the reset signal being generated after the first and second signals exceeding the threshold.

3. The method of claim 2, wherein the first and second data signals are reset after the USB host generates the reset signal.

4. The method of claim 3, further comprising performing data transmission in high/full speed after resetting the first and second data signals.

5. The method of claim 1, further comprising the USB host determining a full speed mode for the USB peripheral device, when the first data signal exceeds the threshold and the second data signal is less than the threshold.

6. The method of claim 1, further comprising the USB host determining a low speed mode for the USB peripheral device, when the first data signal is less than the threshold and the second data signal exceeds the threshold.

7. A USB peripheral device, comprising:
   a first pull-up device pulling up a voltage level of a first signal;

a second pull-up device pulling up a voltage level of a second signal;

a USB device transceiver coupled to the first pull-up device and the second pull-up device, enabling only one of the first and second pull-up devices such that the corresponding signal exceeds a threshold; and enabling the other pull-up device such that the corresponding signal exceeds the threshold in a predetermined period, thereby indicating the USB peripheral device is a high/full speed device, wherein no reset signal is generated before said pulling up of the first and second data signals and said indicating of the high/full speed mode.

8. The USB peripheral device of claim 7, wherein the USB peripheral device is coupled to a USB transmission cable, the USB transmission cable is coupled to an USB host, and comprises power and ground lines for power supply, and first and second data signals for transmitting data.

9. The USB peripheral device of claim 8, further comprising a power supply adaptor receiving power via the power line from the USB host, and adapting the power to provide power supply for the USB peripheral device.

10. The USB peripheral device of claim 9, further comprising first and second pull-up switches, each comprising one end coupled to the adapted power, and the other end coupled to the first and the second pull-up devices respectively, and wherein the USB device transceiver controls the first and second pull-up switches to enable the first and the second pull-up devices.

11. The USB peripheral device of claim 10, wherein the USB device transceiver comprises a PHY (physical layer) device and a MAC/BB (Media Access Control/BaseBand) device coupled thereto, wherein the PHY device comprises the first and the second pull-up switches, and the MAC/BB device controls the first and the second pull-up switches to disconnect or connect the first and second pull-up devices to the adapted power and produce the first and second data signals.

12. The USB peripheral device of claim 8, wherein the predetermined period is a time interval awaiting for the first and second data signals pulled up to the threshold, or a duration for the USB host to generate a reset signal compliant with USB standard, the reset signal being generated after the first and second signals exceeding the threshold.

13. The USB peripheral device of claim 12, wherein the first and second data signals are reset after the USB host generates the reset signal.

14. A USB peripheral device, comprising:
a first pull-up device pulling up voltage level of a first signal before a USB host generates a reset signal;
a second pull-up device pulling up voltage level of a second signal before the USB host generates the reset signal; and a USB device transceiver coupled to the first pull-up device and the second pull-up device, enabling only one of the first and second pull-up devices before the USB host generates the reset signal such that the corresponding signal exceeds a threshold; and enabling the other pull-up device such that the corresponding signal exceeds the threshold in a predetermined period, thereby indicating the USB peripheral device is a high/full speed device before the USB host generates the reset signal, wherein no reset signal is generated before said pulling up of the first and second data signals and said indicating of the high/full speed mode.

15. The USB peripheral device of claim 14, wherein the USB peripheral device is coupled to a USB transmission cable, the USB transmission cable is coupled to an USB host, and comprises power and ground lines for power supply, and first and second data signals for transmitting data.

16. The USB peripheral device of claim 15, further comprising a power supply adaptor receiving power via the power line from the USB host, and adapting the power to provide power supply for the USB peripheral device.

17. The USB peripheral device of claim 16, further comprising first and second pull-up switches, each comprising one end coupled to the adapted power, and the other end coupled to the first and the second pull-up devices respectively, and wherein the USB device transceiver controls the first and second pull-up switches to enable the first and the second pull-up devices.

18. The USB peripheral device of claim 17, wherein the USB device transceiver comprises a PHY (physical layer) device and a MAC/BB (Media Access Control/BaseBand) device coupled thereto, wherein the PHY device comprises the first and the second pull-up switches, and the MAC/BB device controls the first and the second pull-up switches to disconnect or connect the first and second pull-up devices to the adapted power and produce the first and second data signals.

19. The USB peripheral device of claim 15, wherein the predetermined period is a time interval awaiting for the first and second data signals pulled up to the threshold, the reset signal being generated after the first and second signals exceeding the threshold, and the first and second data signals are reset after the USB host generates the reset signal.

20. The USB peripheral device of claim 1, wherein the USB peripheral device pulls high the voltage levels of the first and second data signals before the USB host generates the reset signal, and the USB host determines a high/full speed mode for the USB peripheral device before generating the reset signal.

* * * * *